United States Patent [19]

Kim

[11] Patent Number: 5,176,839
[45] Date of Patent: Jan. 5, 1993

[54] MULTILAYERED MOLD STRUCTURE FOR HOT SURFACE MOLDING IN A SHORT CYCLE TIME

[75] Inventor: Bang M. Kim, Schenectady, N.Y.

[73] Assignee: General Electric Company, Schenectady, N.Y.

[21] Appl. No.: 676,498

[22] Filed: Mar. 28, 1991

[51] Int. Cl.⁵ .............................................. B28B 7/42
[52] U.S. Cl. ........................................ 249/78; 249/111; 249/114.1; 249/116; 249/134; 249/135; 249/112; 425/174.8 R; 425/547
[58] Field of Search ................ 249/78, 114.1, 116, 249/134, 135, 112, 111; 425/174, 174.8 R, 174.8 E, 547; 264/25, 26

[56] References Cited

U.S. PATENT DOCUMENTS

| | | | |
|---|---|---|---|
| 2,979,773 | 4/1961 | Bolstad | 249/78 |
| 3,185,432 | 5/1965 | Hager, Jr. | 249/78 |
| 3,734,449 | 5/1973 | Itou et al. | 249/114 |
| 3,804,362 | 4/1974 | Stromblad et al. | 249/78 |
| 3,827,667 | 8/1974 | Lemelson | 249/135 |
| 4,018,552 | 4/1977 | Prast et al. | 425/407 |
| 4,134,942 | 1/1979 | Mirr et al. | 264/26 |
| 4,225,109 | 9/1980 | Yotsutsuji et al. | 249/111 |
| 4,285,744 | 8/1981 | Rudolph et al. | 264/25 |
| 4,496,131 | 1/1985 | Yang | 264/25 |
| 4,563,145 | 1/1986 | de Meij | 425/407 |
| 4,744,849 | 5/1988 | Michaud-Soret | 249/78 |
| 5,041,247 | 8/1991 | Kim | 264/37 |

FOREIGN PATENT DOCUMENTS

| | | |
|---|---|---|
| 0164259 | 12/1985 | European Pat. Off. |
| 0412346 | 2/1991 | European Pat. Off. |
| 2319477 | 2/1977 | France . |
| 2406516 | 5/1979 | France . |
| 53-86754 | 7/1978 | Japan ................. 249/111 |
| 57-20328 | 2/1982 | Japan . |
| 63-78720 | 4/1988 | Japan .................. 249/78 |
| 1-297208 | 11/1989 | Japan ................ 249/114.1 |
| 572425 | 9/1945 | United Kingdom ........... 264/26 |

*Primary Examiner*—Jay H. Woo
*Assistant Examiner*—Robert B. Davis
*Attorney, Agent, or Firm*—Patrick R. Scanlon; Paul R. Webb, II

[57] ABSTRACT

A multilayered insulated mold structure is provided. An insulation layer provided on each of the mold cores retains heat at the molding surface, thereby increasing surface quality of the finished part. The insulating layer has a varying density across its thickness so as to have a low density center region and high density surface regions. By having a relatively low denisty, the center region of the insulating layer has a low thermal conductivity. Thus, the insulating layer may be made from the same material as the core and still have an acceptable insulating value. The use of the same material for adjacent layers reduces the potential of delamination of the layers. The multilayered mold is compatible with passive or active heating of the molding surface.

14 Claims, 4 Drawing Sheets

MULTILAYERED MOLD STRUCTURE FOR HOT SURFACE MOLDING IN A SHORT CYCLE TIME

CROSS REFERENCES TO RELATED APPLICATIONS

This application is related to the following co-pending applications: "Multilayer Composite Mold Structure for Molding on Hot Surfaces", Ser. No. 07/435,639, filed Nov. 13, 1989 and now U.S. Pat. No. 5,064,597 which is a continuation of Ser. No. 07/175,078, filed Mar. 30, 1988 and now abandoned; "Apparatus for Blow Molding Parts with Smooth Surfaces", Ser. No. 07/435,640, filed Nov. 13, 1989 and now U.S. Pat. No. 5,041,247 which is a continuation of Ser. No. 07/250,806, filed Sep. 29, 1988 and now abandoned; "Plastic Mold Structure and Method of Making", Ser. No. 07/437,051, filed Nov. 15, 1989; and now U.S. Pat. No. 5,124,192 "Method and Apparatus for Molding Plastics on Hot Surfaces Using Induction Heating", Ser. No. 07/486,345, filed Feb. 28, 1990 and now abandoned which is a continuation of Ser. No. 07/253,836, filed Oct. 5, 1988 and now abandoned; and "Method and Apparatus for Molding Plastics on Hot Surfaces Using Dielectric Heating", Ser. No. 07/486,491, filed Feb. 28, 1990 and now abanonded which is a continuation of Ser. No. 07/253,513, filed Oct. 5, 1988 and now abandoned. All of these related applications are assigned to the same assignee as the present invention.

BACKGROUND OF THE INVENTION

This invention relates generally to molding thermoplastic materials and more particularly concerns a multilayered mold structure having active heating means and an improved insulating layer.

Molding of thermoplastic resins is a promising technique for producing a wide variety of plastic parts. Depending on specific requirements, such plastic parts can be made by any of a number of molding processes such as blow molding, compression molding and injection molding. One important requisite for the use of molded plastic parts, particularly in large, exterior panel applications, is a smooth surface quality. The surface of molded plastic parts should be as smooth as that of current exterior parts made from sheet metal. However, conventional molding of plastic parts tends to produce various surface imperfections that require labor intensive sanding and polishing operations to correct. Injection molding of resins with fillers in the form of fibers or powders is particularly susceptible to such imperfections. Molds for injection molding of thermoplastic resin are usually made from metal material such as iron, steel, stainless steel, aluminum alloy or brass. Such materials are advantageous in that they have high thermal conductivity and thus allow the melt of thermoplastic resin to cool rapidly and shorten the molding cycle time. However, because of the rapid cooling, the injected resin freezes instantaneously at the mold surface. The freezing of these materials at the mold surfaces creates rough surfaces such as exposed fillers, voids and porosity. Processing difficulties arise when producing thin, large parts. The quick solidification of the melt combined with limited flowability of the materials makes it difficult to achieve melt flow over a large area. The use of multiple gates for large and/or complex mold cavities produces weld lines, which are unsightly and weak. Another important issue in injection molding of high quality parts is the residual stresses in the molded parts. Residual stress inside a part can result in dimensional instability over the lifetime of the part. Nonuniform residual stresses also produce differential refractive indices. The dimensional stability and uniformity of the refractive index are critically required for high quality optical parts.

An approach to improve the surface quality of plastic parts produced by compression molding and blow molding has been disclosed in the above mentioned applications Ser. No. 07/435,639 and 07/435,640, respectively. These applications generally disclose molding structure in which an insulating layer is disposed on the mold core and a thin skin layer is disposed on the insulating layer. Due to the insulation, the skin layer retains heat during the molding operation, thereby avoiding the surface irregularities created by rapid surface cooling. Thus, these devices provide a smooth surface while maintaining a relatively short cycle time. Similarly, U.S. Pat. No. 4,225,109 to Yotsutsuji et al. discloses using a thermal insulating layer in an injection molding apparatus. U.S. Pat. No. 4,225,109 discloses using an insulating layer comprising a thermosetting resin, a hardener or curing agent and at least one of an inorganic filler, a metal powder filler and a fibrous filler.

The present invention addresses a problem existing in molding processes employing thermal insulation layers of the type discussed above. In particular, layer delamination may occur at the interface between the insulation layer and the mold core and/or the interface of the skin layer and the underlying insulating layer in cases where a skin layer is employed. It is believed that delamination occurs because of poor adhesion between the different layers and due to the differences in the coefficient of thermal expansion (CTE) of the materials of the different layers. Delamination is a prevalent problem in insulated molds because the typically plastic insulating layers have poor adhesion to the adjacent metal layers and a higher CTE than the core which is usually an iron or aluminum alloy.

SUMMARY OF THE INVENTION

Accordingly, it is an object of the present invention to provide an insulated multilayered injection molding apparatus in which the various layers are resistant to delamination.

More specifically, it is an object of the present invention to provide an insulated molding apparatus in which the insulating layer has a varying density to provide strong adhesion to the adjacent layers.

In addition, it is an object of the present invention to provide the molding apparatus with a variety of active heating elements.

These and other objects are accomplished in the present invention by providing a multilayered mold having a core, an insulating layer bonded to the core, and a hard skin layer bonded to the insulating layer. The insulating layer is produced in such a manner so as to have a density variation across its thickness wherein the surface regions of the insulating layer are relatively dense and the center region of said insulating layer is relatively porous or coarse. In a preferred embodiment, the insulating layer is made from the same material as the adjacent layers. Since the same material is used throughout, the problems of poor adhesion and differing coefficient of thermal expansion are minimized. The insulating layer derives its insulation properties from the porous nature of the center region.

The mold may be heated passively by the hot, injected resin, or the mold apparatus can be provided with active heating means such as a resistive heating element, an inductive heating element, or a radio frequency heating system. Another alternative is that the mold can be heated with removable hot inserts.

Other objects and advantages of the present invention will become apparent upon reading the following detailed description and the appended claims and upon reference to the accompanying drawings.

DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE INVENTION

Figure 1:
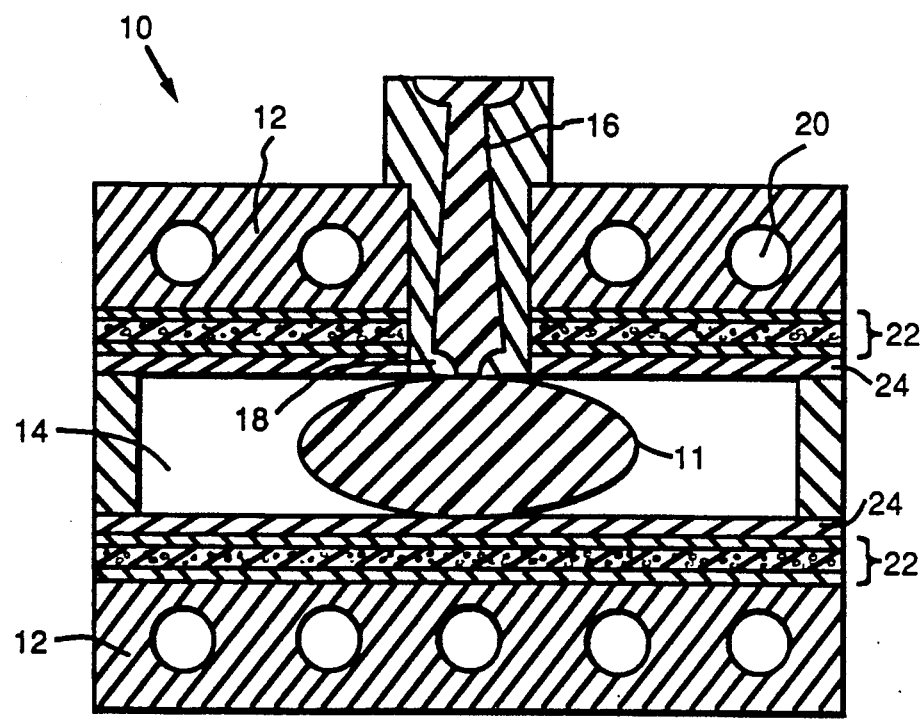
FIG. 1 shows a sectional side view of the present invention.

Referring now to the drawings were like numerals indicate like elements throughout, FIG. 1 shows a multilayered mold 10 of the present invention. While the attributes of the present invention are applicable to many types of molding, an injection molding apparatus is illustrated in the drawings. The mold 10 comprises two core halves 12 situated in opposing relationship so as to form a mold cavity 14 therebetween. Hot thermoplastic resin 11 is injected from a source (not shown) into the mold cavity 14 via a sprue 16 and a gate 18. The mold halves 12 are made of a material with a relatively high thermal conductivity such as iron, steel, stainless steel, aluminum alloy or brass. Cooling lines 20 for receiving a cooling fluid are provided in the core halves to reduce cycle time. A thermal insulating layer 22 is disposed on each of the core halves 12. The thermal insulating layer 22 is ideally made from a low thermally conductive material such as high temperature thermoplastics, thermosets, plastic composites, porous metals, ceramics and low-conductivity metal alloys. Other low thermally conductive materials used for insulation can also be employed.

Depending on the type of insulating material selected, the insulating layer is often not sufficiently strong enough to withstand the molding process and cannot produce the desired surface quality. Therefore, a hard skin layer 24 is optionally applied over the insulating layer 22 to protect the insulating layer and to provide the desired surface finish. The skin layer 24 must be made from a material which exhibits mechanical strength and abrasion resistance. The skin layer should also have a reasonably high thermal conductivity. The skin layer 24 can be fabricated from carbon steel, stainless steel, nickel, aluminum, brass, copper, ceramics, glass, quartz, plastcs and plastic composites. Metal alloys with a low thermal expansion coefficient, such as Invar ferronickel, can also be used.

To overcome the common problem of delamination between the insulating layer 22 and its adjacent layers, the present invention preferably uses an insulating layer made from the same material as the core and the skin layer and having a density variation across its thickness. More specifically, the insulating layer 22 has a low density in the center region and a high density at each of the two surface regions. When the same material is used for each layer throughout the mold structure, the insulation properties of the insulating layer are due to the low density center region. That is, the center region has a lower thermal conductivity because of its porous nature. Also, because of the sameness of materials, the coefficient of thermal expansion (CTE) of the insulating layer will closely match the CTE of the adjacent core and skin layers. With the CTE of the adjacent layers closely matched, the potential of delamination is greatly reduced. Ceramic or metal materials are used when using the same material throughout the mold structure.

An insulating layer having a density variation across its thickness can be made by deposition of ceramics or metals using such deposition techniques as chemical vapor deposition, electroplating, and metal spraying, such as RF sputtering, electron beam deposition and plasma spraying. The low density area can be created by providing air bubbles or adding low density fillers such as hollow glass spheres, ceramics, metal oxides, bentonites, silica and the like in the center region.

In operation, as the hot thermoplastic resin 11 is injected into the mold cavity 14, heat from the resin is absorbed by the skin layer 24. The insulating layer 22 not only prevents quick cooling of the resin but causes the skin layer to reheat. This results in a hot plastic surface for a short time period. The hard skin layer provides the desired surface quality to the finished part.

Figure 2:
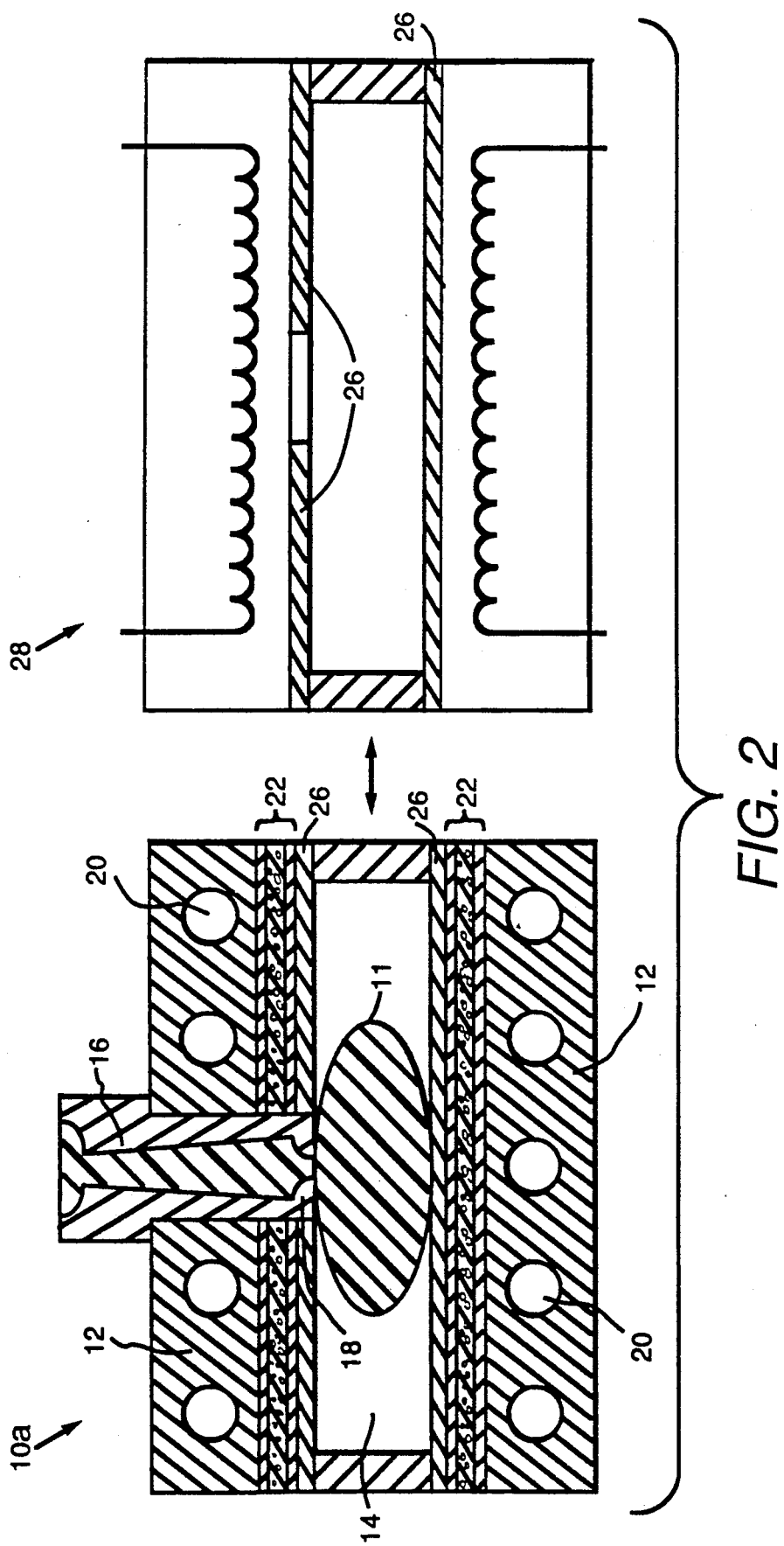
FIG. 2 shows a sectional side view of the present invention using hot mold inserts to heat the mold.

Passive heating of the hot thermoplastic need not be solely relied on. As seen in FIGS. 2-5B, alternative forms of heating may be utilized. FIG. 2 shows hot mold inserts 26 which are used instead of skin layers in the mold 10a. The mold inserts 26 are first heated in a heating device 28 and are then inserted into the mold cavity just prior to injection of the molten resin 11. The thin mold inserts are insulated by the insulating layer 22 and provide a hot mold surface for a short time. This technique has the advantage of providing a hot mold surface from external heat and reducing cycle time because the core halves 12 can be maintained at a lower temperature than in conventional molds.

Figure 3:
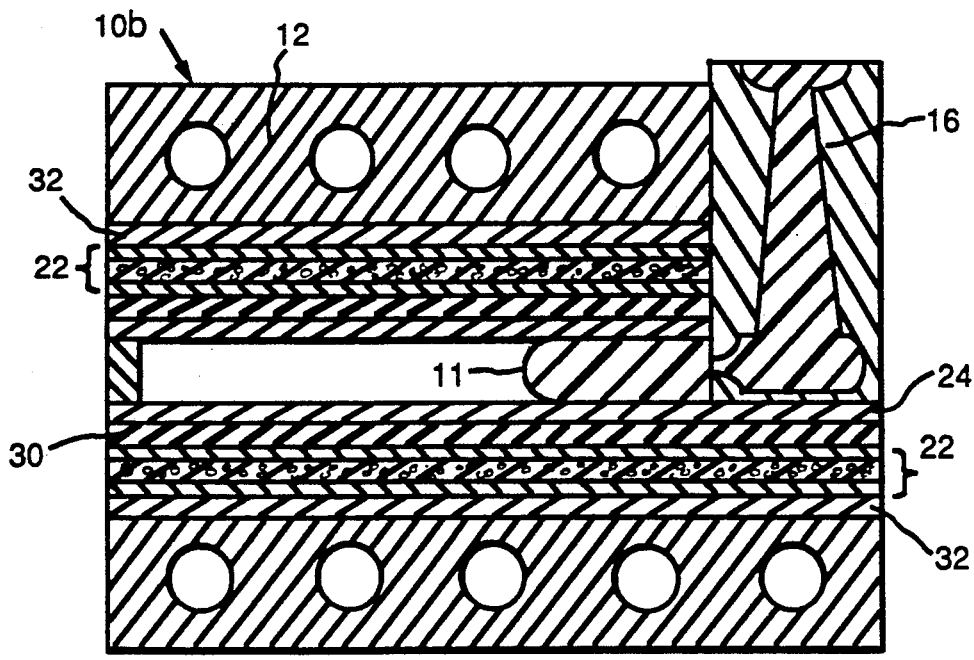
FIG. 3 shows a sectional side view of the present invention using resistive heating to heat the mold.
Figure 4:
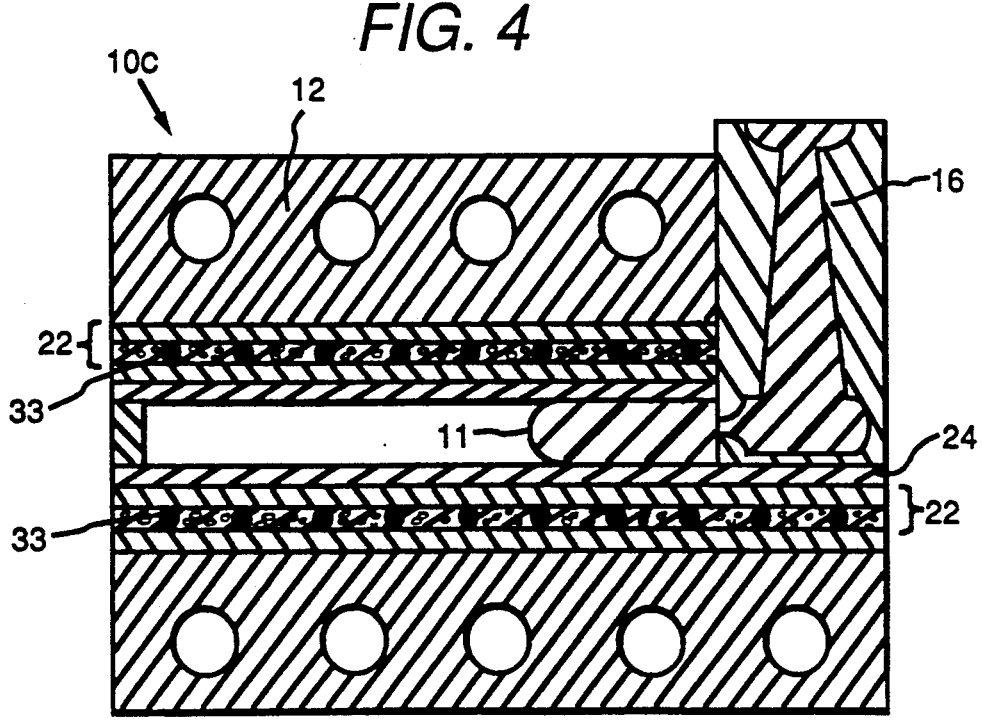
FIG. 4 shows a sectional side view of the present invention using induction heating to heat the mold.

A mold 10b having electric resistive heating of the molding surface is shown in FIG. 3. The heating is achieved by a resistive heating element 30 which is disposed between each insulating layer 22 and the respective skin layer 24. A thermoelectric device 32 is disposed between the core halves 12 and the respective insulating layers 22 to provide fast cooling, thereby reducing cycle time. In FIG. 4, a mold 10c using induction heating is shown. An inductive coil 33 is encapsulated within the insulating layer 22. To be compatible with the inductive coil, the insulating layer is selected from a nonconductive insulating material. The coil 33 is preferably wound with a stranded copper wire and is connected to an AC power supply (not shown). The skin layer 24 comprises a current carrying material that is preferably magnetic. Magnetic materials have a higher heating efficiency than nonmagnetic materials when subjected to induction heating. In operation, the induction coils produce eddy currents in the skin layers 24, thereby heating the skin layers.

Figure 5A:
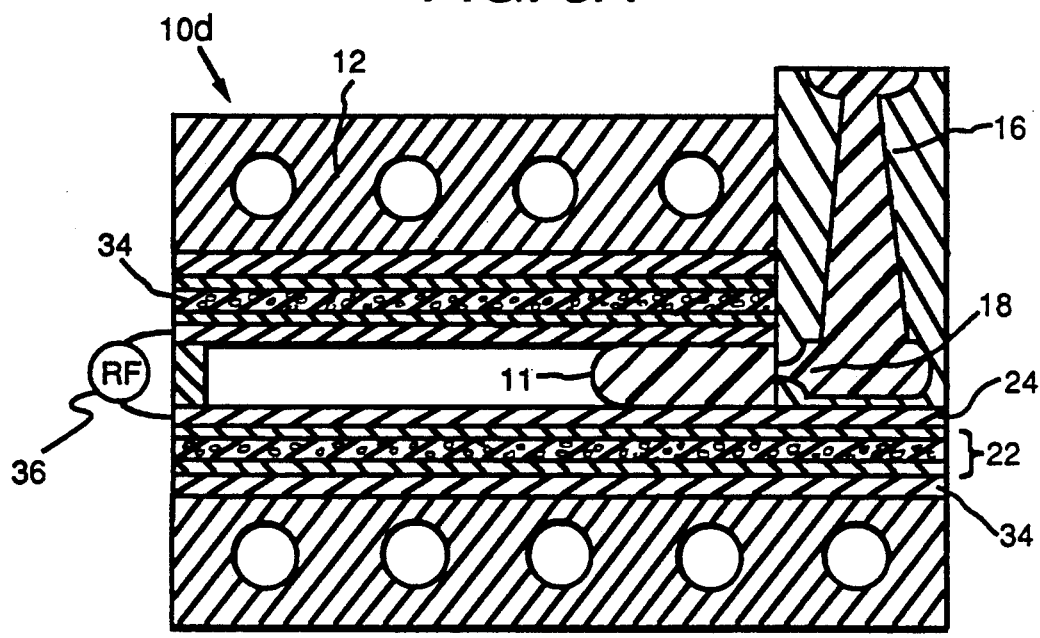
FIG. 5A shows a sectional side view of the present invention using a first embodiment of radio frequency heating to heat the mold.
Figure 5B:
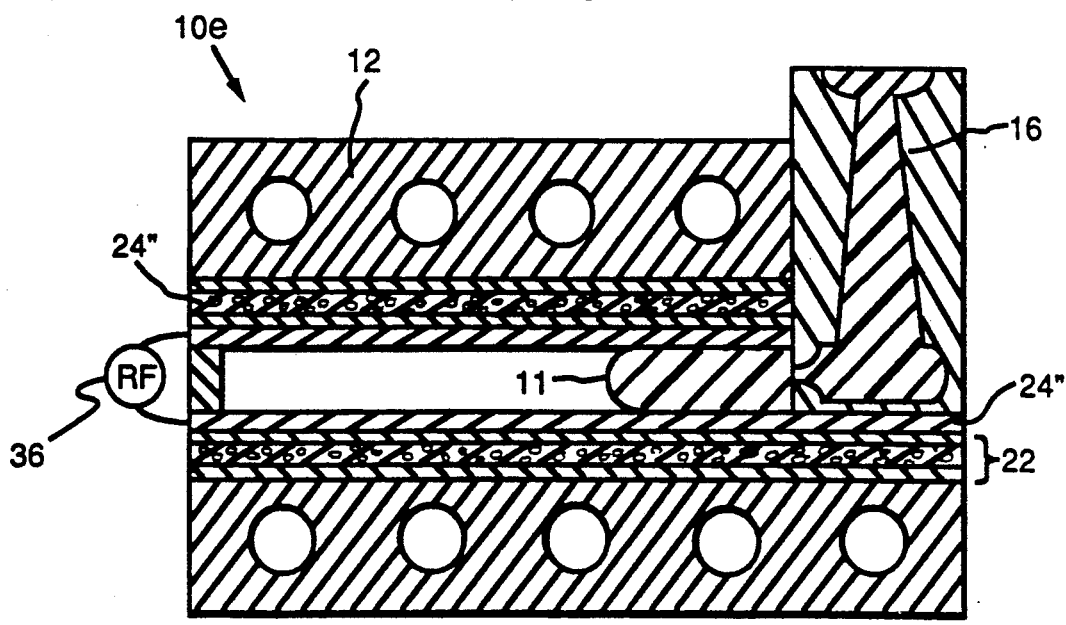
FIG. 5B shows a sectional side view of the present invention using a second embodiment of radio frequency heating to heat the mold.

FIGS. 5A and 5B show two embodiments using different forms of dielectric heating. In FIG. 5A, a mold 10d is provided with a pair of electrodes 34 which are disposed between the respective core halves 12 and insulating layers 22. As with the previous embodiments, a skin layer 24 is bonded to each insulating layer 22 to impart a textured surface and protect the insulating layer. The skin layer of this embodiment comprises a material sensitive to radio frequency magnetic fields such as metals or ceramics containing radio frequency activators to increase the loss factor of the ceramic. The insulating layer 22 should be made from a material having a low loss factor such as plastics, plastic composites and ceramics. A loss factor is an indicator of the relative rates of heating for different materials at the frequency to be employed in the high frequency field of the same intensity. The electrodes are connected to a high frequency power source 36 using as high a frequency as practicable to reduce the voltage requirements. When the electrodes 34 are connected to the power source, a high frequency field is created between the electrodes. The field heats the RF sensitive skin layers 24 and the resin 11 in the mold cavity. On the other hand, the temperature of the electrodes 34 is not significantly increased, thereby keeping cycle time short.

The mold 10e shown in FIG. 5B employs dielectric heating but without using separate electrodes. Instead, current conducting skin layers 24' which act as electrodes are used. The skin layer/electrodes 24' are connected to the high frequency power source 36. In operation, a high frequency field which heats the resin 11 in the mold cavity is created between the skin layers when the power source is activated. The skin layers are not heated directly but rather are heated by the hot resin.

The foregoing has described an improved insulated molding apparatus which produces smooth parts with low residual stress while avoiding the problem of layer delamination. The invention is compatible with passive as well as active heating of the mold surface. Existing molding apparatuses can be adapted to incorporate the features of the present invention without great effort or expense.

While specific embodiments of the present invention have been described, it will be apparent to those skilled in the art that various modifications thereto can be made without departing from the spirit and scope of the invention as defined in the appended claims. For instance, while the invention has been described in an injection molding apparatus, the varying density insulating layer could be applied to other types of molding devices such as blow molding and compression molding.

What is claimed is:

1. A multilayered mold for molding thermosplastic material into finished parts comprising:
    a mold member having a contoured surface; and
    a thermal insulating layer bonded to said contoured surface and having a lower thermal conductivity than said mold member, said insulating layer comprising the same material as said mold member and having a density variation wherein the surface regions of said insulating layer have a higher density than the center region of said insulating layer.

2. The mold of claim 1 further comprising a skin layer bonded to said insulating layer, said skin layer comprising the same material as said insulating layer and having a higher thermal conductivity than said insulating layer.

3. The mold of claim 2 further comprising a heater for heating said skin layer.

4. The mold of claim 3 wherein said heater comprises a resistive heating element.

5. The mold of claim 3 wherein said heater comprises an induction coil.

6. The mold of claim 3 wherein said heater comprises a radio frequency heating system.

7. The mold of claim 1 wherein said insulating layer is made of a ceramic material.

8. The mold of claim 1 wherein said insulating layer is made of a metallic material.

9. The mold of claim 1 wherein the low density center region of said insulating layer includes a low density filler material.

10. A multilayered mold for injection molding preheated thermoplastic material into finished parts comprising:
    a mold member having a contoured surface;
    a thermal insulating layer bonded to the contoured surface and having a lower thermal conductivity than said mold member, said insulating layer comprising the same material as said mold member and having a density variation wherein the surface regions of said insulating layer have a higher density than the center region of said insulating layer;
    a skin layer bonded to said insulating layer and having a higher thermal conductivity than said insulating layer; and
    means for heating said skin layer disposed between said mold member and said skin layer.

11. The multilayered mold of claim 10 wherein said means for heating comprises a resistive heating element disposed between said insulating layer and said skin layer.

12. The multilayered mold of claim 10 wherein said means for heating comprises an inductive coil encapsulated within said insulating layer.

13. The multilayered mold of claim 10 wherein said mold member comprises two halves, each of said halves having an insulating layer and a skin layer bonded thereto, and said means for heating comprises an electrode disposed between each of said halves and the respective insulating layers and a high frequency power source connected to said electrodes.

14. The multilayered mold of claim 10 wherein said mold member comprises two halves, each of said halves having an insulting layer and a skin layer bonded thereto, and said means for heating comprises a high frequency power source connected to the respective skin layer of each of said halves.

* * * * *